United States Patent
Hong et al.

(10) Patent No.: US 10,328,878 B2
(45) Date of Patent: Jun. 25, 2019

(54) VEHICLE ROLLOVER SENSING SYSTEM USING DRIVING INFORMATION FOR OPTIMIZATION

(71) Applicants: Hyundai Motor Company, Seoul (KR); Kia Motors Corporation, Seoul (KR)

(72) Inventors: Seok-Ho Hong, Seoul (KR); Sung-Soo Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 308 days.

(21) Appl. No.: 15/288,355

(22) Filed: Oct. 7, 2016

(65) Prior Publication Data

US 2017/0305374 A1    Oct. 26, 2017

(30) Foreign Application Priority Data

Apr. 26, 2016  (KR) ........................ 10-2016-0050532

(51) Int. Cl.
  *B60R 21/0132* (2006.01)
  *B60R 21/13* (2006.01)
  *B60R 21/013* (2006.01)
  *B60R 21/00* (2006.01)

(52) U.S. Cl.
  CPC .......... *B60R 21/0132* (2013.01); *B60R 21/13* (2013.01); *B60R 2021/0018* (2013.01); *B60R 2021/01313* (2013.01)

(58) Field of Classification Search
  CPC ................ B60R 21/0132; B60R 21/13; B60R 21/01313; B60R 2021/0018
  See application file for complete search history.

(56) References Cited

U.S. PATENT DOCUMENTS

| | | | |
|---|---|---|---|
| 2004/0030473 A1* | 2/2004 | Lu ...................... | B60G 17/0162 701/36 |
| 2009/0099735 A1* | 4/2009 | McCoy ............... | B60R 21/0134 701/46 |

FOREIGN PATENT DOCUMENTS

| | | |
|---|---|---|
| JP | 2003-523892 A | 8/2003 |
| JP | 2004-131071 A | 4/2004 |
| JP | 2008-179300 A | 8/2008 |
| JP | 4380489 B2 | 10/2009 |
| JP | 4833853 B2 | 9/2011 |
| JP | 2013-193591 A | 9/2013 |
| KR | 10-0537981 B1 | 12/2005 |
| KR | 10-0896637 B1 | 5/2009 |

(Continued)

*Primary Examiner* — Anne M Antonucci
(74) *Attorney, Agent, or Firm* — Morgan Lewis & Bockius LLP

(57) ABSTRACT

A vehicle rollover sensing system using driving information for optimization includes a longitudinal-velocity estimator determining a longitudinal velocity of a vehicle using a wheel speed, a steering angle, and GPS vehicle velocity information; a lateral-velocity estimator determining a lateral velocity of the vehicle using the longitudinal velocity, a yaw rate, a steering angle, a lateral acceleration, and GPS vehicle heading direction information; a rollover type determiner deciding a rollover type of the vehicle using the longitudinal velocity and the lateral velocity of the vehicle; and a restraint device deployment determiner determining whether or not to deploy a vehicle restraint device according to the decision by the rollover type determiner.

8 Claims, 3 Drawing Sheets

(56) References Cited

FOREIGN PATENT DOCUMENTS

| | | | |
|---|---|---|---|
| KR | 10-0991435 | B1 | 11/2010 |
| KR | 10-1027958 | B1 | 4/2011 |
| KR | 10-1543156 | B1 | 8/2015 |

* cited by examiner

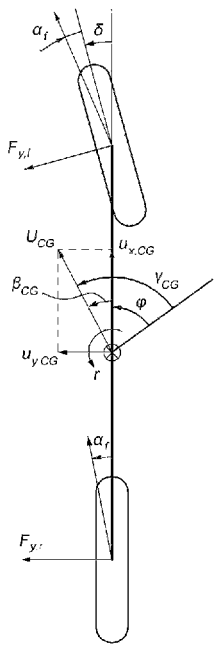

$$ma_y = F_{yf} \cos(\delta) + F_{yr} \qquad (1)$$

$$Ir = aF_{yf} \cos(\delta) - bF_{yr} \qquad (2)$$

$$U = \frac{1}{m}(mVr + 2F_{tf} \cos(\delta_f) - 2F_{sf} \sin(\delta_f) + 2F_{tr}) \qquad (3)$$

$$V = \frac{1}{m}(-mUr + 2F_{tf} \sin(\delta_f) - 2F_{sf} \cos(\delta_f) + 2F_{sr}) \qquad (4)$$

$$r = \frac{1}{I_{zz}}(2aF_{tf} \sin(\delta_f) + 2aF_{sf} \cos(\delta_f) - 2bF_{sr}) \qquad (5)$$

$$\omega = \frac{1}{I_w}(T_i - RF_{t_i} - dF_{t_i} - \frac{1}{2}Tbrk_i) \qquad (6)$$

$$F_x = \frac{C_i \lambda}{1 - \lambda} f(S), \quad F_y = \frac{C_a \tan \alpha}{1 - \lambda} f(S) \qquad (7)$$

$$\boxed{v_y = \sum(a_y + v_x \omega_z)}$$

FIG. 3

VEHICLE ROLLOVER SENSING SYSTEM USING DRIVING INFORMATION FOR OPTIMIZATION

CROSS-REFERENCE TO RELATED APPLICATION

This application claims the benefit of priority to Korean Patent Application No. 10-2016-0050532, filed on Apr. 26, 2016 in the Korean Intellectual Property Office, the entirety of which is incorporated herein by reference.

TECHNICAL FIELD

The present disclosure relates to a system for sensing a vehicle's orientation and movement when there is a potential vehicle rollover, and more particularly, to a system which exhibits improved vehicle rollover sensing performance by more accurately sensing the lateral behavior of a vehicle, thereby increasing safety through the deployment of a vehicle restraint device at the appropriate time.

BACKGROUND

Devices that increase the stability of a vehicle while driving include an Anti-lock Brake System (ABS) for preventing slippage upon braking, and a Traction Control System (TCS) for preventing slippage upon sudden acceleration.

In addition, Electronic Stability Programs (ESPs), which assist a vehicle in stably maintaining the attitude of the vehicle during driving so as to increase the driving stability of the vehicle, are currently being developed and used.

That is, the ABS is a system for ensuring braking stability, the TCS is a system for ensuring acceleration stability, and the ESP is a system for stably maintaining the attitude of the vehicle while controlling the torque of an engine or controlling a brake in cooperation with the ABS when the vehicle assumes a dangerous attitude.

The aforementioned systems for improving driving stability need to decide, for example, the longitudinal velocity and lateral velocity of the vehicle and road conditions using a plurality of sensors, such as a wheel speed sensor, a brake pressure sensor, a steering angle sensor, a yaw rate sensor, and a lateral acceleration sensor, and to control various restraint devices based on the results, in order to ensure the safety of the vehicle.

However, conventional systems for improving driving stability have derived desired values via the measurement of a wheel speed in the case of estimating the longitudinal velocity of the vehicle. Because tires are separated from the ground surface in the state where rollover of the vehicle occurs, the measurement error of the wheel speed increases, which makes it difficult to accurately measure the longitudinal velocity of the vehicle.

In addition, although the conventional systems have derived desired values using only a yaw rate and a steering angle in the case of estimating the lateral velocity of the vehicle, the estimation of the actual direction in which the vehicle travels has been impossible due to slippage of the vehicle in the situation in which rollover of the vehicle occurs.

Therefore, there is a demand for a system capable of accurately estimating the longitudinal velocity and lateral velocity of a vehicle even in a vehicle rollover situation, thereby ensuring the appropriate deployment of vehicle restraint devices when the rollover situation is sensed.

SUMMARY

The present disclosure has been made in view of the above problems, and it is an object of the present disclosure to provide a system which achieves improved vehicle rollover sensing performance by more accurately sensing the lateral behavior of a vehicle, which may occur due to a severe environment or extreme driving, thereby ensuring the reliable deployment of restraint devices.

Technical objects to be achieved by the present disclosure are not limited to those mentioned above, and other objects may be clearly understood by those skilled in the art from the description given below.

In accordance with the present disclosure, the above and other objects can be accomplished by the provision of a vehicle rollover sensing system using driving information optimization including a longitudinal-velocity estimator determining a longitudinal velocity of a vehicle using a wheel speed, a steering angle, and GPS vehicle velocity information; a lateral-velocity estimator determining a lateral velocity of the vehicle using the longitudinal velocity, a yaw rate, a steering angle, a lateral acceleration, and GPS vehicle heading direction information; a rollover type determinater deciding a rollover type of the vehicle using the longitudinal velocity and the lateral velocity of the vehicle; and a restraint device deployment determinater determining whether or not to deploy a vehicle restraint device according to the decision by the rollover type determinater.

The wheel speed may be measured by a wheel speed sensor, and the wheel speed sensor may include a first wheel speed sensor for measuring a speed of a left front wheel of the vehicle, a second wheel speed sensor for measuring a speed of a right front wheel of the vehicle, a third wheel speed sensor for measuring a speed of a left rear wheel of the vehicle, and a fourth wheel speed sensor for measuring a speed of a right rear wheel of the vehicle.

The rollover type determinater may decide the rollover type of the vehicle by additionally using one or more of a roll rate, a lateral acceleration and a vertical acceleration of the vehicle.

The vehicle rollover sensing system may further include a GPS use decider for preventing information from a GPS from being used to estimate the velocity when the GPS vehicle velocity information or the GPS vehicle heading direction information is not accurate or when the system fails to receive the GPS vehicle velocity information or the GPS vehicle heading direction information.

The GPS use decider may include a counter, and the counter may increase a count value when the GPS vehicle velocity information or the GPS vehicle heading direction information is not accurate or when the system fails to receive the GPS vehicle velocity information or the GPS vehicle heading direction information, thereby preventing the information from the GPS from being used to estimate the velocity when the count value reaches a preset value or more.

The longitudinal-velocity estimator may decide whether or not the steering angle exceeds a critical value, and thereafter, may compare each wheel speed with a first average value so that the longitudinal velocity is determined as a first longitudinal velocity when a difference between each wheel speed and the first average value is within a tolerance range. The longitudinal-velocity estimator may again compare each wheel speed with a second average value when the difference between each wheel speed and the first average value exceeds the tolerance range so that the longitudinal velocity is determined as a second longitudinal velocity when the difference between each wheel speed and the second average value is within a tolerance range. The longitudinal-velocity estimator may again compare the GPS vehicle velocity information with a third average value when the difference between each wheel speed and the second average value exceeds the tolerance range so that the longitudinal velocity is determined as a third longitudinal velocity when a difference between the GPS vehicle velocity information and the third average value is within a tolerance range and so that the longitudinal velocity is determined as a fourth longitudinal velocity when the difference between the GPS vehicle velocity information and the third average value exceeds the tolerance range. Here, the first average value may be an average value of the wheel speeds measured by the first wheel speed sensor to the fourth wheel speed sensor, the second average value may be an average value of the wheel speeds measured by the first wheel speed sensor to the fourth wheel speed sensor, excluding the measured value of the wheel speed sensor that has the largest difference from the first average value, and the third average value may be an average value of the measured values of the wheel speed sensors, which are used to calculate the second average value, excluding the measured value of the wheel speed sensor that has the largest difference from the second average value.

When the steering angle exceeds the critical value, the first longitudinal velocity may be (the first average value+the GPS vehicle speed information)/2, the second longitudinal velocity may be (the second average value+the GPS vehicle speed information)/2, the third longitudinal velocity may be (the third average value+the GPS vehicle speed information)/2, and the fourth longitudinal velocity may be the GPS vehicle speed information).

When the steering angle does not exceed the critical value, the first longitudinal velocity may be the first average value, the second longitudinal velocity may be the second average value, the third longitudinal velocity may be the third average value, and the fourth longitudinal velocity may be the GPS vehicle speed information.

The lateral-velocity estimator may determine the lateral velocity of the vehicle using the following Equation:

$$v_y = \Sigma(a_y + v_x w_x),$$

where, $v_y$ is a lateral-velocity value of the vehicle, $a_y$ is a lateral-acceleration value of the vehicle, $v_x$ is a longitudinal-velocity value of the vehicle, and $w_x$ is a yaw rate value.

BRIEF DESCRIPTION OF THE DRAWINGS

The above and other objects, features and other advantages of the present disclosure will be more clearly understood from the following detailed description taken in conjunction with the accompanying drawings, in which:

FIG. 3 is a view illustrating an operation of determining the lateral velocity of a vehicle by a lateral-velocity estimator in accordance with an exemplary embodiment in the present disclosure.

DETAILED DESCRIPTION OF THE EMBODIMENTS

Hereinafter, exemplary embodiments of the present invention will be described in detail with reference to the accompanying drawings. In addition, the terms or words used in the specification and claims of the present invention are not interpreted using typical or dictionary limited meanings, and are constructed as meanings and concepts conforming to the technical sprit of the present invention based on the principle that the inventors can appropriately define the concepts of the terms to explain the present invention in the best manner. Accordingly, it is to be understood that the detailed description, which will be disclosed along with the accompanying drawings, is intended to describe the exemplary embodiments of the present invention and is not intended to represent all technical ideas in the present disclosure. Therefore, it should be understood that various equivalents and modifications can exist which can replace the embodiments described in the time of the application.

The terminology used herein is for the purpose of describing particular exemplary embodiments only and is not intended to be limiting. As used herein, the singular forms are intended to include the plural forms as well, unless the context clearly indicates otherwise.

The present disclosure is presented in an effort to improve vehicle rollover sensing performance by more accurately sensing the lateral behavior of a vehicle and to increase the stability of the vehicle. To this end, a vehicle rollover sensing system in accordance with an exemplary embodiment in the present disclosure includes a longitudinal-velocity estimator 100 for determining the longitudinal velocity of the vehicle using a wheel speed, steering angle, and GPS vehicle velocity information, a lateral-velocity estimator 200 for determining the lateral velocity of the vehicle using the longitudinal velocity, yaw rate, steering angle, lateral acceleration, and GPS vehicle heading direction information, a rollover type determinater 300 for deciding the rollover type of the vehicle using the longitudinal velocity and the lateral velocity of the vehicle, and a restraint device deployment determinater 400 for determining whether or not to deploy a vehicle restraint device based on the decision by the rollover type determinater 300.

Figure 1:
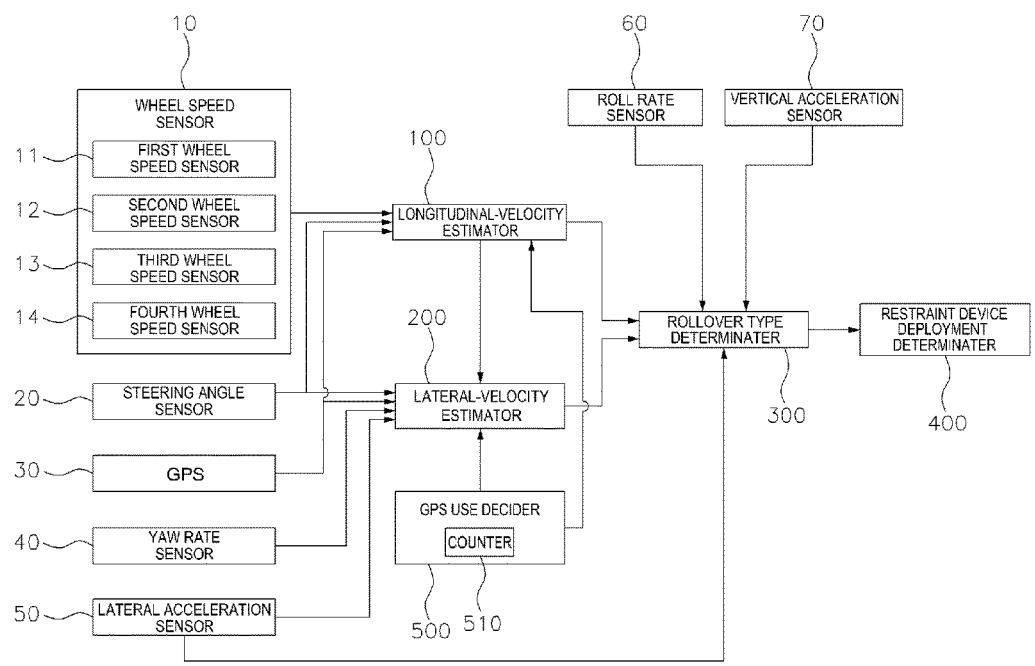
FIG. 1 is a view illustrating the configuration of a vehicle rollover sensing system using driving information for optimization in accordance with an exemplary embodiment in the present disclosure.

To assist in understanding the present disclosure, FIG. 1 illustrates the configuration of the vehicle rollover sensing system using driving information for optimization in accordance with an exemplary embodiment.

First, the longitudinal-velocity estimator 100 estimates the longitudinal velocity of the vehicle, and determines the longitudinal velocity of the vehicle using a wheel speed, steering angle, and GPS vehicle velocity information.

In other words, the longitudinal velocity of the vehicle is determined using a steering angle, acquired from a steering angle sensor 20, and a wheel speed, acquired from a wheel speed sensor 10, and the determined longitudinal velocity is compensated using GPS vehicle velocity information acquired from a GPS 30 so as to more accurately determine the velocity.

The wheel speed sensor 10 includes a first wheel speed sensor 11 for measuring the speed of a left front wheel of the vehicle, a second wheel speed sensor 12 for measuring the speed of a right front wheel of the vehicle, a third wheel speed sensor 11 for measuring the speed of a left rear wheel of the vehicle, and a fourth wheel speed sensor 14 for measuring the speed of a right rear wheel of the vehicle. The configuration of the wheel speed sensor may be changed according to the number of wheels mounted to the vehicle.

Figure 2:
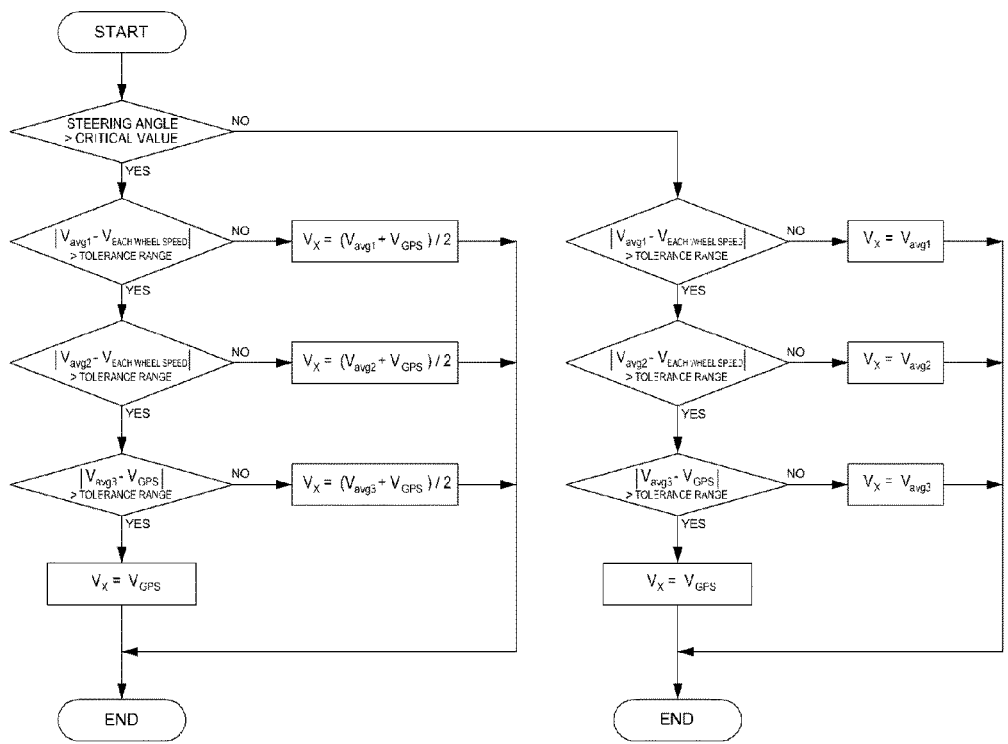
FIG. 2 is a flowchart illustrating an operation of determining the longitudinal velocity of a vehicle by a longitudinal-velocity estimator in accordance with an exemplary embodiment in the present disclosure.

In more detail, FIG. 2 is a flowchart illustrating an operation of determining the longitudinal velocity of the vehicle by the longitudinal-velocity estimator 100 in accordance with an exemplary embodiment in the present disclosure, and a description related to FIG. 2 will follow.

The longitudinal-velocity estimator 100 first decides whether or not a current steering angle exceeds a critical value, and sequentially performs longitudinal-velocity determination operations depending on each case.

When the steering angle exceeds the critical value, the longitudinal-velocity estimator 100 compares the speed of each wheel with a first average value. When the difference between each wheel speed and the first average value is within a tolerance range, the longitudinal velocity is calculated as being equal to (the first average value+the GPS vehicle velocity information)/2. When the difference between each wheel speed and the first average value exceeds the tolerance range, the longitudinal-velocity estimator 100 again compares the speed of each wheel with a second average value. When the difference between each wheel speed and the second average value is within a tolerance range, the longitudinal velocity is calculated as being equal to (the second average value+the GPS vehicle velocity information)/2. When the difference between each wheel speed and the second average value exceeds the tolerance range, the longitudinal-velocity estimator 100 again compares GPS vehicle velocity information with a third average value. When the difference between the GPS vehicle velocity information and the third average value is within a tolerance range, the longitudinal velocity is calculated as being equal to (the third average value+the GPS vehicle velocity information)/2. When the difference between each wheel speed and the third average value exceeds the tolerance range, the longitudinal velocity is calculated as being equal to the GPS vehicle velocity information.

Contrary to the above description, when the steering angle does not exceed the critical value, the longitudinal-velocity estimator 100 compares the speed of each wheel with a first average value. When the difference between each wheel speed and the first average value is within a tolerance range, the longitudinal velocity is calculated as being equal to the first average value. When the difference between each wheel speed and the first average value exceeds the tolerance range, the longitudinal-velocity estimator 100 again compares the speed of each wheel with a second average value. When the difference between each wheel speed and the second average value is within a tolerance range, the longitudinal velocity is calculated as being equal to the second average value. When the difference between each wheel speed and the second average value exceeds the tolerance range, the longitudinal-velocity estimator 100 again compares GPS vehicle velocity information with a third average value. When the difference between the GPS vehicle velocity information and the third average value is within a tolerance range, the longitudinal velocity is calculated as being equal to the third average value. When the difference between each wheel speed and the third average value exceeds the tolerance range, the longitudinal velocity is calculated as being equal to the GPS vehicle velocity information.

The first average value is defined as the average value of wheel speeds measured by the first wheel speed sensor 11 to the fourth wheel speed sensor 14. The second average value is defined as the average value of wheel speeds measured by the first wheel speed sensor 11 to the fourth wheel speed sensor 14, excluding the measured value of the wheel speed sensor that has the largest difference from the first average value. The third average value is defined as the average value of the measured values of the wheel speed sensors, which are used to calculate the second average value, excluding the measured value of the wheel speed sensor that has the largest difference from the second average value.

That is, in the case where only the steering angle and the wheel speed are used to determine the longitudinal velocity of the vehicle, the longitudinal velocity of the vehicle, determined using the wheel speed, may be erroneous because tires are separated from the ground surface under the condition in which rollover of the vehicle occurs.

Therefore, an exemplary embodiment in the present disclosure may compensate for the erroneous longitudinal velocity using GPS vehicle velocity information acquired from the GPS 30, so as to more accurately estimate the longitudinal velocity of the vehicle.

In addition, the lateral-velocity estimator 200 serves to estimate the lateral velocity (behavior) of the vehicle, and determines the lateral velocity of the vehicle using the longitudinal velocity, yaw rate, steering angle, lateral acceleration, and GPS vehicle heading direction information.

Likewise, the lateral velocity of the vehicle is determined using the longitudinal velocity, yaw rate, steering angle, and lateral acceleration acquired respectively from the longitudinal-velocity estimator 200, a yaw-rate sensor 40, a steering angle sensor 20, and a lateral acceleration sensor 50. In addition, upon the determination of the lateral velocity, the actual direction in which the vehicle travels is more accurately determined using GPS vehicle heading direction information acquired from the GPS 30.

To assist in understanding, FIG. 3 is a view illustrating an operation of determining the lateral velocity of a vehicle by the lateral-velocity estimator 200 in accordance with an exemplary embodiment in the present disclosure.

Although the value δ (the intended vehicle heading direction) may be known from the steering angle of the vehicle, it is difficult to estimate the value α (the actual vehicle heading direction) when vehicle slippage occurs in a rollover situation.

Therefore, when using the value α acquired from the GPS vehicle heading direction information, $V_y$ may be more accurately estimated using $a_y$ acquired from Equation (7) of FIG. 3.

That is, the lateral-velocity estimator 200 has the feature of more accurately determining the lateral velocity of the vehicle using the following Equation:

$$v_y = \Sigma(a_y + v_x w_x),$$

where $v_y$ is the lateral-velocity value of the vehicle, $a_y$ is the lateral-acceleration value of the vehicle, $v_x$ is the longitudinal-velocity value of the vehicle, and $w_x$ is the yaw rate value.

Then, the rollover type determinater 300 decides the rollover type of the vehicle using the longitudinal velocity of the vehicle, determined by the longitudinal-velocity estimator 100, and the lateral velocity of the vehicle, determined by the lateral-velocity estimator 200.

However, in order to more accurately decide the rollover type, the rollover type determinater 300 may decide the rollover type of the vehicle by additionally using one or more of a roll rate acquired from a roll rate sensor 60, a lateral acceleration acquired from the lateral acceleration sensor 50, and a vertical acceleration acquired from the vertical acceleration sensor 70.

Based on the result decided by the rollover type determinater 300, the restraint device deployment determinater 400 determines whether or not to deploy a restraint device of the vehicle. The restraint device may be deployed when a roll rate and a roll angle exceed critical values based on a preset type, but minimum safe conditions are satisfied.

In addition, the vehicle rollover sensing system in the present disclosure further includes a GPS use decider 500 for preventing the information from the GPS 30 from being used to estimate the velocity when the GPS vehicle velocity information or the GPS vehicle heading direction information is not accurate or when the system fails to receive the GPS vehicle velocity information or the GPS vehicle heading direction information.

Because the information from the GPS 30 is data transmitted from outside the vehicle and received by the vehicle, the case where the vehicle receives inaccurate information or fails to receive the information may occur due to system abnormality or when the vehicle is located in a communication shadow area, such as a tunnel, or when the vehicle is located deep in the mountains.

Therefore, the GPS use decider 500 includes a counter 510. The counter 510 increases a count value when the GPS vehicle velocity information or the GPS vehicle heading direction information is not accurate or when the system fails to receive the GPS vehicle velocity information or the GPS vehicle heading direction information. Thereby, when the count value reaches a preset value or more, the GPS use decider 500 prevents the information from the GPS 30 from being used to estimate the longitudinal velocity or the lateral velocity.

The longitudinal-velocity estimator 100, the lateral-velocity estimator 200, the rollover type determinater 300, the GPS use decider 500, and the restraint device deployment determinater 400 may be implemented with a hardware processor or the hardware processor executing software instructions to perform functions thereof.

In conclusion, an exemplary embodiment in the present disclosure has the advantage of clearly deciding whether or not rollover of the vehicle occurs by more accurately sensing the abnormal lateral behavior of the vehicle, which may occur due to various situations during vehicle driving (more particularly, a vehicle rollover situation).

In this way, through a clear decision of whether or not rollover of the vehicle occurs, it is possible to deploy a vehicle restraint device at the appropriate time, which may ensure the safety of a driver and passengers. In addition, because no additional sensor components are required in order to implement the present exemplary embodiment, there are additional advantages including being efficient in terms of cost.

Although exemplary embodiments in the present disclosure have been disclosed for illustrative purposes, those skilled in the art will appreciate that various modifications, additions and substitutions are possible, without departing from the scope and spirit of the invention as disclosed in the accompanying claims.

What is claimed is:

1. A vehicle rollover sensing system using driving information for optimization comprising a processor configured to:

determine a longitudinal velocity of a vehicle using a wheel speed, a steering angle, and GPS vehicle velocity information;

determine a lateral velocity of the vehicle using the longitudinal velocity, a yaw rate, the steering angle, a lateral acceleration, and GPS vehicle heading direction information;

determine a rollover type of the vehicle using the longitudinal velocity and the lateral velocity of the vehicle; and determine whether or not to deploy a vehicle restraint device according to the determined rollover type, wherein the wheel speed is measured by a wheel speed sensor which includes:

a first wheel speed sensor measuring a speed of a left front wheel of the vehicle;

a second wheel speed sensor measuring a speed of a right front wheel of the vehicle;

a third wheel speed sensor measuring a speed of a left rear wheel of the vehicle; and a fourth wheel speed sensor measuring a speed of a right rear wheel of the vehicle, wherein the processor is further configured to:

determine whether the steering angle exceeds a critical value and compare each wheel speed with a first average value so that the longitudinal velocity is determined as a first longitudinal velocity when a difference between each wheel speed and the first average value is within a first tolerance range;

compare each wheel speed with a second average value when the difference between each wheel speed and the first average value exceeds the first tolerance range so that the longitudinal velocity is determined as a second longitudinal velocity when the difference between each wheel speed and the second average value is within a second tolerance range; and compare the GPS vehicle velocity information with a third average value when the difference between each wheel speed and the second average value exceeds the second tolerance range so that the longitudinal velocity is determined as a third longitudinal velocity when a difference between the GPS vehicle velocity information and the third average value is within a third tolerance range and so that the longitudinal velocity is determined as a fourth longitudinal velocity when the difference between the GPS vehicle velocity information and the third average value exceeds the third tolerance range, wherein the first average value is an average value of the wheel speeds measured by the first wheel speed sensor to the fourth wheel speed sensor, the second average value is an average value of the wheel speeds measured by the first wheel speed sensor to the fourth wheel speed sensor, excluding the measured value of the wheel speed sensor that has a largest difference from the first average value, and the third average value is an average value of the measured values of the wheel speed sensors, which are used to calculate the second average value, excluding the measured value of the wheel speed sensor that has a largest difference from the second average value.

2. The vehicle rollover sensing system according to claim 1, wherein the processor determines the rollover type of the vehicle by additionally using one or more of a roll rate, the lateral acceleration, and a vertical acceleration of the vehicle.

3. The vehicle rollover sensing system according to claim 1, the processor is further configured to prevent information from a GPS from being used to estimate the velocity when the GPS vehicle velocity information or the GPS vehicle heading direction information is not accurate or when the system fails to receive the GPS vehicle velocity information or the GPS vehicle heading direction information.

4. The vehicle rollover sensing system according to claim 3, wherein the processor includes a counter, and
the counter increases a count value when the GPS vehicle velocity information or the GPS vehicle heading direction information is not accurate or when the system fails to receive the GPS vehicle velocity information or the GPS vehicle heading direction information, thereby preventing the information from the GPS from being used to estimate the velocity when the count value reaches a preset value or more.

5. The vehicle rollover sensing system according to claim 1, wherein the first longitudinal velocity is (the first average value+the GPS vehicle speed information)/2, the second longitudinal velocity is (the second average value+the GPS vehicle speed information)/2, the third longitudinal velocity is (the third average value+the GPS vehicle speed information)/2, and the fourth longitudinal velocity is the GPS vehicle speed information) when the steering angle exceeds the critical value.

6. The vehicle rollover sensing system according to claim 1, wherein the first longitudinal velocity is the first average value, the second longitudinal velocity is the second average value, the third longitudinal velocity is the third average value, and the fourth longitudinal velocity is the GPS vehicle speed information when the steering angle does not exceed the critical value.

7. The vehicle rollover sensing system according to claim 1, wherein the processor determines the lateral velocity of the vehicle using the following Equation:

$$v_y = \Sigma(a_y + v_x w_x),$$

where $v_y$ is a lateral-velocity value of the vehicle, $a_y$ is a lateral-acceleration value of the vehicle, $v_x$ is a longitudinal-velocity value of the vehicle, and $w_x$ is a yaw rate value.

8. The vehicle rollover sensing system according to claim 1, wherein the vehicle restraint device is or is not deployed according to the determined rollover type.

* * * * *